United States Patent
Wu et al.

(10) Patent No.: US 6,722,611 B1
(45) Date of Patent: Apr. 20, 2004

(54) REINFORCED AIRCRAFT SKIN AND METHOD

(76) Inventors: Kuang-Hsi Wu, 12815 SW. 119 Ter., Miami, FL (US) 33186; Milton J. Torres, 11200 SE. 99th Ct., Miami, FL (US) 33176

( * ) Notice: Subject to any disclaimer, the term of this patent is extended or adjusted under 35 U.S.C. 154(b) by 77 days.

(21) Appl. No.: 09/665,257

(22) Filed: Sep. 19, 2000

Related U.S. Application Data

(60) Provisional application No. 60/155,370, filed on Sep. 20, 1999.

(51) Int. Cl.[7] ................................................. B64C 1/40
(52) U.S. Cl. ....................................... 244/126; 244/125
(58) Field of Search ................................ 244/125, 126, 244/119, 133; 428/204, 166, 216

(56) References Cited

U.S. PATENT DOCUMENTS

| | | | | |
|---|---|---|---|---|
| 3,092,530 A | * | 6/1963 | Plummer | 138/151 |
| 3,160,549 A | * | 12/1964 | Caldwell et al. | 181/207 |
| 3,305,196 A | * | 2/1967 | Hanlon | 244/123 |
| 3,416,756 A | * | 12/1968 | Windecker | 244/119 |
| 3,655,426 A | * | 4/1972 | Fuchs | 427/388.3 |
| 3,767,500 A | * | 10/1973 | Tally et al. | 156/162 |
| 3,951,717 A | * | 4/1976 | Herweg et al. | 156/79 |
| 4,054,710 A | * | 10/1977 | Botsolas | 428/317.7 |
| 4,054,711 A | * | 10/1977 | Botsolas | 442/31 |
| 4,105,820 A | * | 8/1978 | Antoni | 428/213 |
| 4,129,697 A | * | 12/1978 | Schapel et al. | 428/422.8 |
| 4,170,675 A | * | 10/1979 | Greengrass | 428/109 |
| 4,235,398 A | * | 11/1980 | Johnson | 244/119 |
| 4,282,276 A | * | 8/1981 | Smith | 428/34.3 |
| 4,284,447 A | * | 8/1981 | Dickens et al. | 156/299 |
| 4,292,353 A | * | 9/1981 | Ohashi et al. | 428/211 |
| 4,292,363 A | * | 9/1981 | Briggs | 264/45.3 |
| 4,296,170 A | * | 10/1981 | Ohashi et al. | 428/317.5 |
| 4,307,203 A | * | 12/1981 | Blount | 521/136 |
| 4,377,646 A | * | 3/1983 | Blount | 521/154 |
| 4,395,453 A | * | 7/1983 | Lines et al. | 428/215 |
| 4,401,707 A | * | 8/1983 | Bailey et al. | 428/166 |
| 4,671,471 A | * | 6/1987 | Patmont | 244/123 |
| 4,692,477 A | * | 9/1987 | Jacobina | 264/46.4 |
| 4,693,926 A | * | 9/1987 | Kowalski et al. | 428/204 |
| 4,774,794 A | * | 10/1988 | Grieb | 52/309.12 |
| 4,791,148 A | * | 12/1988 | Riley et al. | 521/159 |
| 4,804,425 A | * | 2/1989 | Hoffmann et al. | 156/324 |
| 5,057,545 A | * | 10/1991 | Muhl et al. | 521/103 |
| 5,251,849 A | * | 10/1993 | Torres | 244/117 R |
| 5,604,266 A | * | 2/1997 | Mushovic | 521/122 |
| 5,711,492 A | * | 1/1998 | Cheladze | 241/220 |
| 5,985,362 A | * | 11/1999 | Specht et al. | 264/46.4 |
| 6,030,559 A | * | 2/2000 | Barry et al. | 264/257 |
| 6,167,624 B1 | * | 1/2001 | Lanahan et al. | 264/142 |
| RE37,095 E | * | 3/2001 | Glorioso et al. | 264/45.3 |

FOREIGN PATENT DOCUMENTS

GB        1470006    *   4/1977

* cited by examiner

*Primary Examiner*—Charles T. Jordan
*Assistant Examiner*—Stephen A Holzen
(74) *Attorney, Agent, or Firm*—Marshall, Gerstein & Borun LLP

(57) ABSTRACT

An aircraft body structure is disclosed and has a skeleton frame including a plurality of interconnected frame elements. A skin layer is affixed to at least a portion of the frame elements. The skin layer has an exterior surface and an opposite interior surface. A composite reinforcing layer is affixed to at least a substantial portion of the interior surface of the skin layer. The composite reinforcing layer has a reinforcing material combined with a non-flammable polymer foam material in a variety of different manners.

13 Claims, 2 Drawing Sheets

REINFORCED AIRCRAFT SKIN AND METHOD

RELATED APPLICATION DATA

The instant application is related to co-pending U.S. provisional patent application Ser. No. 60/155,370, filed on Sep. 20, 1999.

FIELD OF THE INVENTION

The present invention relates generally to aircraft fuselage, and more particularly to a reinforced aircraft skin and a method for reinforcing aircraft skin.

BACKGROUND OF THE INVENTION

Most commercial and military aircraft have finite operational lives that span several decades. As a result, many airlines and the military operate aircraft that are decades old. Among the various problems which are common to aging aircraft, material fatigue is one of the most critical. Component failure that is caused by fatigue or flaws in the materials of some components can have a catastrophic effect on aircraft.

Most aircraft cabins are pressurized during high altitude flight to provide comfort for the passengers. The pressure difference between the inside and the outside of an aircraft increases and decreases as the aircraft climbs and descends, respectively, to higher and lower altitudes during flight. In essence, the aircraft body structure or fuselage acts as a pressure vessel by maintaining a constant pressure that is close to one atmosphere inside the aircraft body.

The cyclical deflections of the fuselage caused by cyclical pressurization and depressurization of the aircraft can create small cracks in a skin of the fuselage that propagate with additional cyclical expansion and contraction of the aircraft body. At some point during flight, a large crack may propagate so fast that the section of skin on which the crack occurs exposes the inside of the aircraft body to the outside environment, thus causing rapid depressurization of the cabin. The skin can also become instantly dislodged from the aircraft body when catastrophic failure occurs, in which case, sudden depressurization can cause some passengers and objects to be sucked out of the cabin. Furthermore, aerodynamics of the aircraft can be so severely affected as a result of a large skin panel becoming dislodged from the aircraft body that maintaining flight or controlling the aircraft during flight may become impossible.

The skin fatigue or catastrophic failure problems can be improved or solved by strengthening aircraft skin to reduce flexure during in-flight pressurization cycles. Increasing the skin thickness is one possible solution, but an impractical one at best. A thicker skin layer adds weight to the aircraft, which in turn reduces the payload capacity, the flight range, and/or the aerodynamic efficiency of the air craft. This in turn translates into fewer passengers and/or a reduction in cargo capacity, resulting in increased operating costs. A more practical solution should increase the strength of the skin layer without adding significant weight to the aircraft. A practical solution should also be cost effective, not create other unforeseeable hazards to passengers and crew, be easily adaptable to existing and new aircraft, be insoluble in materials that are used in aircraft operation, and not hinder the performance and cost effectiveness of aircraft.

U.S. Pat. No. 5,251,849 suggests one such solution. The patent discloses affixing a polymer foam material to the interior side of an aircraft skin material to reduce structural failures caused by metal fatigue resulting from many cycles of in-flight pressurization and depressurization.

SUMMARY OF THE INVENTION

In accordance with an aspect of the teachings of the present invention, an aircraft fuselage or body structure has a skeleton frame and a skin layer affixed to at least part of the skeleton frame. The aircraft body structure is strengthened by affixing a composite reinforcing layer to at least a substantial portion of an interior surface of the skin layer. The composite reinforcing layer includes a polymer foam material combined with a reinforcing material.

In accordance with another aspect of the teachings of the present invention, a method is disclosed for strengthening an aircraft body structure having a skeleton frame and an aircraft skin layer affixed to at least a portion of the skeleton frame. The method includes adding a reinforcing material to a polymer foam material to form a composite reinforcing layer. The method also includes affixing the composite reinforcing layer to at least an interior surface of the skin layer.

Other features and advantages of the present invention will become apparent from a review of the specification and drawings, in which like reference numerals denote like structures.

DESCRIPTION OF THE PREFERRED EMBODIMENTS

Figure 1:
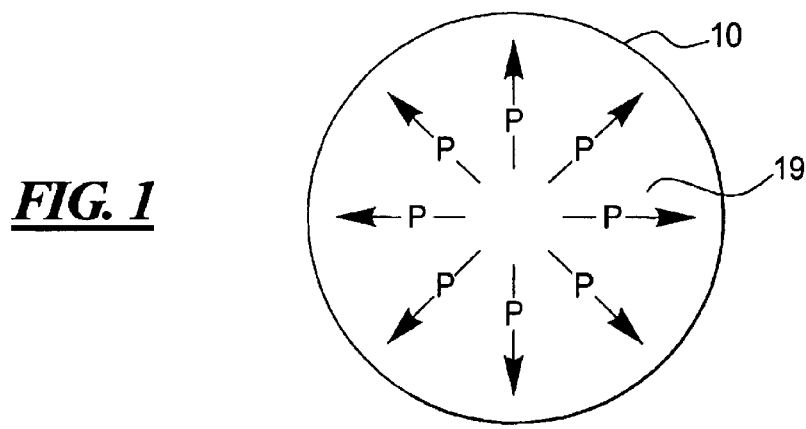
FIG. 1 is a cross-sectional view of an aircraft body structure.
Figure 2:
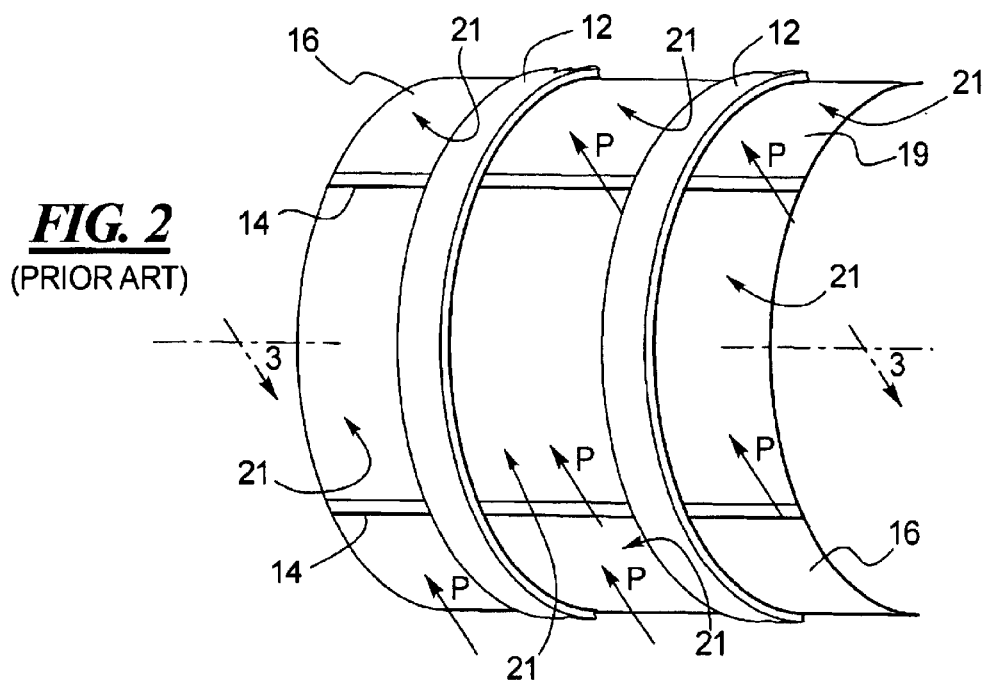
FIG. 2 is an isometric view of an internal section of an aircraft body structure.
Figure 3:
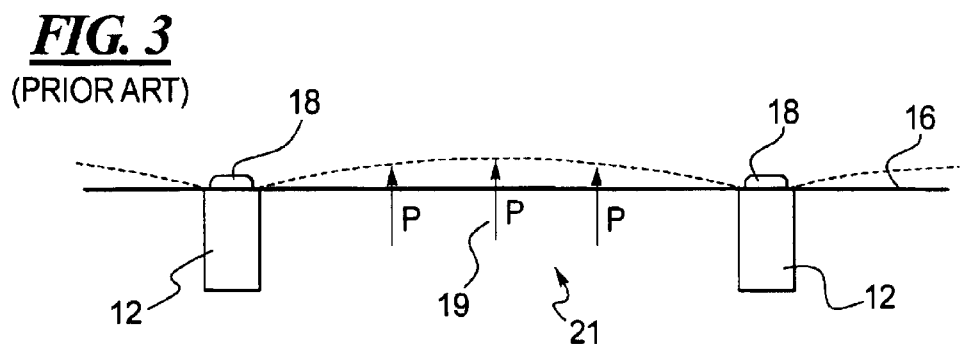
FIG. 3 is a cross-sectional view taken along line 3—3 of the internal section of the aircraft body structure of FIG. 2.

Referring now to the drawings, FIGS. 1–3 illustrate a simplified aircraft body structure or fuselage 10 having a plurality of bulkheads 12, a plurality of stringers 14 interconnecting the bulkheads, and a skin layer 16 covering the bulkheads and stringers. The bulkheads 12 and stringers 14 form a skeleton frame of the body structure 10. The skin layer 16 can be formed as a plurality of discrete panels or as a large continuous sheet. The skin layer 16 is attached to at least part of the frame, such as the bulkheads 12 by a suitable fastening technique, such as, for example, with a plurality of rivets 18. The bulkheads 12 and stringers 14 provide structural support and rigidity for the aircraft body 10. The skin layer 16 also adds structural support for the aircraft body 10 by interconnecting parts of the skeleton frame such as the bulkheads 12. However, the skin layer more importantly defines the exterior aerodynamic shape of the aircraft by which flight is made possible.

The bulkheads 12, stringers 14, and skin layer 16 can be made from virtually any suitable material. A majority of modern aircraft include an exterior skin layer typically made from aluminum. Although aluminum is the most widely used material for constructing aircraft components, advances in material sciences have allowed aircraft manufacturers to use lightweight, high strength composite materials, metallic alloys and the like.

As an aircraft climbs to altitudes above sea level, the pressure within the aircraft body 10 is maintained at around one atmosphere. The pressure difference between the inside and outside of the aircraft body 10 creates pressure P, as depicted by arrows 19, distributed over the skin layer 16, which expands the skin layer of the aircraft body. Expansion of the skin layer 16 (as depicted by the dashed line in FIG. 3) creates stress at the areas where the skin layer is joined to the aircraft body, such as the areas around the rivets 18. Cyclical expansion and contraction of the skin layer 16 during operation of an aircraft causes fatigue in the skin layer, particularly where the stress concentration is greatest, such as adjacent or near the rivets 18. Fatigue stress can cause microscopic cracks in the skin layer 16. The cracks can propagate with continued cyclical expansion and contraction of the skin layer 16 and can result in sections of the skin layer becoming detached from the aircraft body 10. If the aircraft is in flight when sections of the skin layer 16 become detached, sudden depressurization of the cabin will likely occur and can cause severe injury to the passengers or loss of life. Furthermore, the aircraft may not be able to sustain flight because of aerodynamic changes to the aircraft body 10 as a result of the sections of the skin layer 16 becoming detached.

Figure 4:
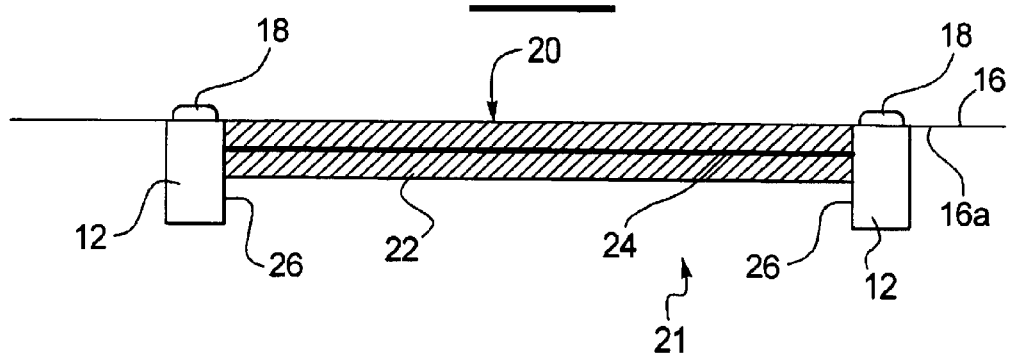
FIG. 4 is an alternative cross-sectional view also taken along line 3—3 of the internal section of the aircraft body structure of FIG. 2 and having a composite reinforcing layer affixed to the skin layer and to the facing sides of the bulkheads in accordance with one example of the teachings of the present invention.

Referring to FIG. 4, an example of an aircraft body 10 with improved skin layer strength characteristics includes the bulkheads 12, stringers 14 (although not shown in FIG. 4), skin layer 16, rivets 18, and a composite layer 20 attached to the skin layer. The composite reinforcing layer 20 is affixed to the inside or interior surface 16a of the skin layer 16. The composite reinforcing layer 20 is generally formed from a non-flammable polymer foam material 22 and a reinforcing material such as the material 24 schematically shown in the figure. In a preferred construction, the composite reinforcing layer 20 is also affixed to a facing edge 26 of the adjacent bulkheads 12.

In one example, the foam material 22 is preferably a polyisocyanurate foam, which has properties useful and suitable for application to an aircraft skin layer. Polyisocyanurate foams offer a much greater compressive and tensile strength than the minimum required for the skin to withstand pressure differences between the interior of an aircraft body and ambient atmosphere at high altitudes. Additionally, polyisocyanurate foams have low density, do not burn, and adhere well to aluminum. Furthermore, polyisocyanurate foams are insoluble in materials used to operate an aircraft, such as cleaning agents, hydraulic oils, lubricants and fuels. In a preferred construction, the polymer foam material used to fabricate the composite reinforcing layer is closed cell polyisocyanurate foam.

Testing with foam insulation that is formed from thermosetting polyisocyanurate resins has shown that resins mixed at higher temperatures produce a lower strength foam material. Furthermore, foam strength increases during the first post-cure week and then the foam strength gradually decreases with time. The particular type of foam material is certainly not limited to polyisocyanurate foams. Other foam materials can be used to fabricate the reinforcing layer as well, such as polyurethane foams. Other types of foam material can be advantageous to use in forming the composite reinforcing layer, depending upon the required strength, cost, size and other characteristics of a particular aircraft. One skilled in the art can choose the foam material with properties that are best suited for various aircraft depending on different operational, economic and environmental factors.

Figure 5:
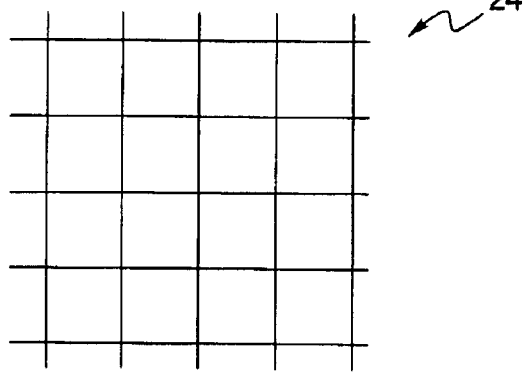
FIG. 5 is a schematic front view of a mesh grid reinforcing material constructed according to one example of the teachings of the present invention.
Figure 6:
FIG. 6 is a schematic front view of an alternative reinforcing material constructed according to another example of the teachings of the invention.

In one example of the composite reinforcing layer 20, the reinforcing material 24 is a mesh or grid pattern of interconnected fibers formed from an aramid fiber material. One such material is poly(p-phenylene terephthalamide), marketed by DuPont Corporation under the trade name KEVLAR and by Akzo Corporation under the trade name TWARON. A single layer, double layers or multiple mesh layers of the reinforcing material 24 can be added to the foam material 22 to reinforce the foam and form the composite layer 20. Each layer can also be virtually any type of grid or mesh formation and the multiple layers can be oriented in the mesh or grid formations in many different arrangements relative to one another. For example, the grid can simply be a grid of equally spaced horizontal and vertical crisscrossing fiber strands as shown in FIG. 5. Alternatively, the grid can include a plurality of equally spaced curvilinear crisscrossing fiber strands as shown in FIG. 6. The grid patterns can also be formed of randomly arranged and spaced fiber strands. The grid can also be a thin, tightly woven layer of fine fiber strands, almost a fabric, or can be formed of more spaced apart fibers. The invention is not to be limited by any particular type or pattern of mesh reinforcing layer or any particular type of fiber material.

Figure 7:
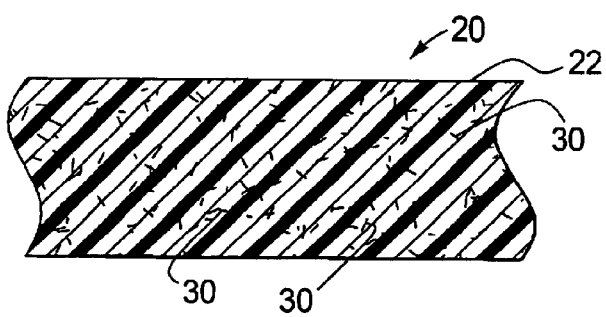
FIG. 7 is a cross-sectional view of a composite reinforcing layer including a plurality of reinforcing material elements interspersed in a foam material and constructed according to another example of the teachings of the invention.

In another example, the reinforcing material 24 of the composite layer 20 can alternatively be a plurality of loose fiber strands, continuous or discontinuous fibers, material particles, slivers, or whiskers, for example, of reinforcing material 30 embedded and interspersed in the foam material 22 as shown in FIG. 7. The loose fibers, particles, or other material elements will add some structural rigidity to the foam when the foam is cured. The loose fibers, particles, or the like can be added having particular lengths, thicknesses and shapes and can be added in particular amounts in order to achieve desired weight and/or strength characteristics.

The composite reinforcing layer 20 is not to be limited to the use of a reinforcing material 24 formed from aramid fibers, such as poly(p-phenylene terephthalamide). Other reinforcing materials may be used as well, such as carbon graphite or ceramic fibers; poly(m-phenylene terephthalamide), which is marketed by DuPont under the trade name NOMEX; silicon nitride; silicon carbide; polyamides; polyaramids; gel spun polyethylene; polyarylates; and sulfur fibers [e.g., materials formed from poly (phenylene sulfide)].

Other reinforcing materials may not provide the same strength to weight ratio that a mesh formed from aramid fibers would provide. However, performance, production, and cost requirements of each type of aircraft may dictate the use of materials other than aramid fibers. For example, whiskers of silicon nitride added to the foam material 22 will not yield the high strength to weight ratio that would result from using one or more layers of a KEVLAR mesh in the foam material. However, if the high strength of the composite foam material constructed with KEVLAR mesh is not necessary for a particular type of aircraft, the use of loose fibers or whiskers of silicon nitride as a reinforcing material may result in a lower weight gain and lower production cost for the composite reinforcing layer 20 and yet provide adequate strength. Furthermore, certain reinforcing materials may have qualities that are better suited for a particular aircraft. Material characteristics such as insulation properties, electromagnetic and electrostatic characteristics, moisture absorption, cabin sound proofing, and response to various environmental factors may dictate the type of reinforcing material that can be used. One skilled in the art can select a reinforcing material depending on the type of foam material used, the operational parameters of a particular aircraft, such as the number of expected pressurization cycles over a specific time span, the environmental factors affecting the operation of a particular type of aircraft, and other factors that may influence the manufacturing, operation, and maintenance of an aircraft.

The composite reinforcing layer 20 can be formed and applied to the skin layer 16 in any suitable manner, although only some possible examples are disclosed herein. One example is to make or mold the layers 20 and then install the layers on the aircraft skin layer. The composite reinforcing layer 20 may first be formed by adding the mesh material to the resin while it is in a liquid state in a mold and allowing the resin to cure. Alternatively, the mesh can first be secured in a mold and then the resin can be added to the mold in a liquid state. In either method, the mesh is embedded in the cured foam.

The addition of the reinforcing material to the foam increases the Young's modulus and strength of the foam significantly with an almost negligible weight gain. It was observed that by adding one layer of KEVLAR mesh, both Young's modulus and strength of the foam increased three to four-fold. A ten-fold increase of Young's modulus and strength can be obtained using a double-layer of KEVLAR. The use of other reinforcing materials may yield different strength results as those observed for KEVLAR mesh. If loose fiber material is uniformly distributed in the foam material, for example, the resulting composite foam material may not have the same strength to weight ratio as a composite foam material constructed with KEVLAR mesh. However, distributing loose fiber material in the foam material to form the composite reinforcing layer 20 may provide greater weight savings in comparison to using KEVLAR mesh as the fiber reinforcing material. In applications where weight reduction is critical and achieving very high strength in the composite foam material is not, a composite foam material having uniform fiber distribution in the foam material may be the best solution. In contrast, in applications where high strength and flexibility are critical, sheets of a graphite-epoxy material, not a woven mesh grid or fabric, can also serve as the reinforcing material. Using such sheets may result in a higher strength to weight ratio than a composite reinforcing layer constructed with KEVLAR mesh.

Another exemplary method of applying the composite reinforcing layer 20 is to simultaneously form the layer and to apply the layer to the skin layer 16. The first step is to pour the polymer foam material 22, and, if-possible, the reinforcing material 24 into the various spaces 21 that are defined between and enclosed by the bulkheads 12 and the stringers 14. The feasibility or the required steps for this pouring technique depend on the type of reinforcing material 24 used. If the reinforcing material 24 includes whiskers or small fiber strands, the fibers can be mixed with the liquid foam material and the foam and reinforcing materials can be subsequently poured together. If a mesh grid reinforcing material 24 is used, the foam material 22 can be poured in the spaces 21, a layer of the reinforcing material 24 can be placed on the foam material 22, and then more foam material can be poured over the grid and first poured foam material. If more than one layer of reinforcing material 24 is used, the sequence of pouring the foam material 22, placing the reinforcing material 24, and subsequently pouring the foam material 22 can be repeated as needed.

Alternatively, the mesh reinforcing material can be temporarily suspended against or near the interior surface 16a of the skin layer 16. The foam material can be poured over the skin layer and the mesh reinforcing material simultaneously. The foam material can flow over the mesh, embedding the mesh in the foam when cured.

Another exemplary method of applying the composite foam material 20 to the inside surface 16a of the skin layer 16 is by spraying the foam material 22 into the spaces 21. The sequence of spraying the foam material 22 to the inside surface of the skin 16 and adding the reinforcing material 24 is identical to the alternate application sequences for the pouring method described above. Again, the sequence will depend on the type of reinforcing material used. Mixed foam and loose fiber strands can be sprayed together. Where a mesh is used, the mesh can be suspended from the skin layer and then the foam sprayed, or the mesh can be added between spray sequences.

The foam material 22 cures in place and attaches itself to the inside of the skin layer 16, such that the skin layer and the foam material act as a composite unit. Polyisocyanurate foam, for example, expands by about thirty times and adheres very well to aluminum. The amount of stress required to delaminate polyisocyanurate foam from aluminum skin is greater than the stress necessary to delaminate the foam itself. Therefore, the foam will detach from the skin before it delaminates.

The amount of foam material 22 that is poured or sprayed depends on the required thickness of the cured composite reinforcing material 20 considering the change in volume of the foam material 22 when cured.

The pouring and spraying methods for applying the composite foam material 20 to the inside of the skin 16 can be varied depending on the types of foam material 22 and reinforcing material 24 used. For example, if the reinforcing material 24 is not in mesh form, but in fiber form, the foam material 22 can be mixed with the reinforcing material 24 before being poured into the space 21. Various other methods may be used for applying the composite reinforcing material 20 to the skin 16. The composite reinforcing material 20 may be formed and cured in molds that are identical to each of the spaces 21. The composite reinforcing material 20 that is cured in the shape of the spaces 21 can be later attached to the inside of the skin 16 with the same foam material 22 acting as an adhesive, or with various other types of adhesives.

The thickness, the number of layers of the reinforcing material 24, the type of reinforcing material 24, and the compressive and tensile strengths of the composite foam material 20 may be selected or designed for each aircraft depending on its operational characteristics. Aircraft specific factors that may influence the design of the composite foam material may include rates of climb and descend, environmental factors such as climates of the regions where the aircraft operates, the type of skin used on the aircraft such as aluminum, metallic alloys, or composite materials, the internal structure of the aircraft such as spacing of the bulkheads, and maintenance and replacement costs. For example, an aircraft that has a smaller aircraft body diameter may need a thinner layer of the composite reinforcing material having only one layer of the reinforcing material. A large trans-oceanic aircraft that operates at high altitudes may need a much thicker composite reinforcing material having several layers of the reinforcing material. One skilled in the art can design the composite reinforcing material for a specific aircraft by considering its operational parameters to achieve sufficient tensile and compressive strength for preventing failure due to skin fatigue.

The use of the composite reinforcing material is not limited to airplane skins. The composite reinforcing material is applicable to any pressure vessel type of device, or any situation where the components of a device or a machine are subject to repeated expansions and contraction.

The foregoing detailed description has been given for clearness of understanding only, and no necessary limitations should be understood therefrom, as modifications would be obvious to those skilled in the art.

What is claimed is:

1. An aircraft body structure comprising:
    a skeleton frame having a plurality of interconnected frame elements;
    a skin layer affixed to at least a portion of the frame elements, the skin layer having an exterior surface and an opposite interior surface; and
    a composite, non-laminate reinforcing layer directly bonded to at least a substantial portion of the interior surface of the skin layer, the composite, non-laminate reinforcing layer including a reinforcing material embedded in a polymer foam material, the reinforcing material comprising at least one mesh grid sheet fabricated from a material selected from the group consisting of, poly(p-phenylene terephthalamide) aramid fiber, poly(m-phenylene terephthalamide) aramid fiber, polyaramid fiber, polyarylate fiber, poly(phenylene sulfide) fiber, and mixtures thereof.

2. An aircraft body structure as defined in claim 1, wherein the skeleton frame elements include at least a plurality of interconnected bulkheads and wherein the skin layer is affixed to an exterior side of the bulkheads.

3. An aircraft body structure as defined in claim 1, wherein the polymer foam material comprises a closed cell foam material.

4. An aircraft body structure as defined in claim 1, wherein the polymer foam material comprises an insulating material.

5. An aircraft body structure as defined in claim 1, wherein the polymer foam material comprises polyisocyanurate foam.

6. An aircraft body structure as defined in claim 1, wherein the polymer foam material comprises polyurethane foam.

7. An aircraft body structure as defined in claim 1, wherein the at least one sheet is a mesh grid sheet of aramid fiber material.

8. An aircraft body structure as defined in claim 1, wherein the at least one sheet is a mesh grid sheet having a plurality of interconnected linear fibers.

9. An aircraft body structure as defined in claim 1, wherein the at least one sheet is a mesh grid having a plurality of interconnected curvilinear fibers.

10. An aircraft body structure as defined in claim 1, wherein the reinforcing material further comprises a plurality of discrete strengthening fibers interspersed and embedded within a layer of the polymer foam material.

11. An aircraft body structure as defined in claim 10, wherein the discrete fibers are silicone nitride fibers.

12. An aircraft body structure as defined in claim 1, wherein the composite reinforcing layer is also affixed to a portion of the frame elements.

13. An aircraft body structure comprising:
    a skeleton frame having a plurality of interconnected frame elements;
    a skin layer affixed to at least a portion of the frame elements, the skin layer having an exterior surface and an opposite interior surface; and
    a composite, non-laminate reinforcing layer directly affixed to at least a portion of the interior surface of the skin layer, the composite, non-laminate reinforcing layer including a mesh grid sheet of reinforcing material within a polymer foam insulating and closed-cell material, the mesh grid sheet comprising a fiber material selected from the group consisting of poly(p-phenylene terephthalamide) aramid fiber, poly(m-phenylene terephthalamide) aramid fiber, polyaramid fiber, polyarylate fiber, poly(phenylene sulfide) fiber, and mixtures thereof.

* * * * *